Figure 1:
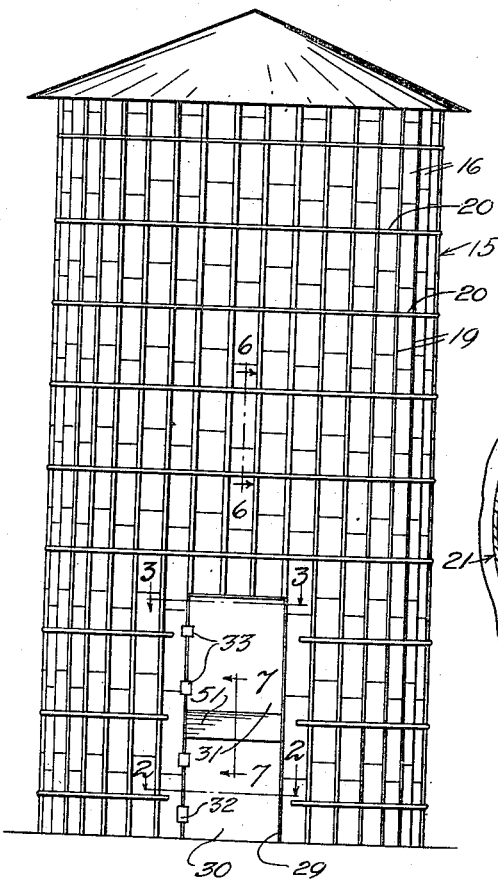

Dec. 5, 1939.  W. C. LUTZ  2,182,728
SILO
Filed Sept. 9, 1938  2 Sheets-Sheet 1

Inventor
WILLARD C. LUTZ,
By Kimmel & Crowell,
Attorneys.

Dec. 5, 1939.   W. C. LUTZ   2,182,728
SILO
Filed Sept. 9, 1938   2 Sheets-Sheet 2
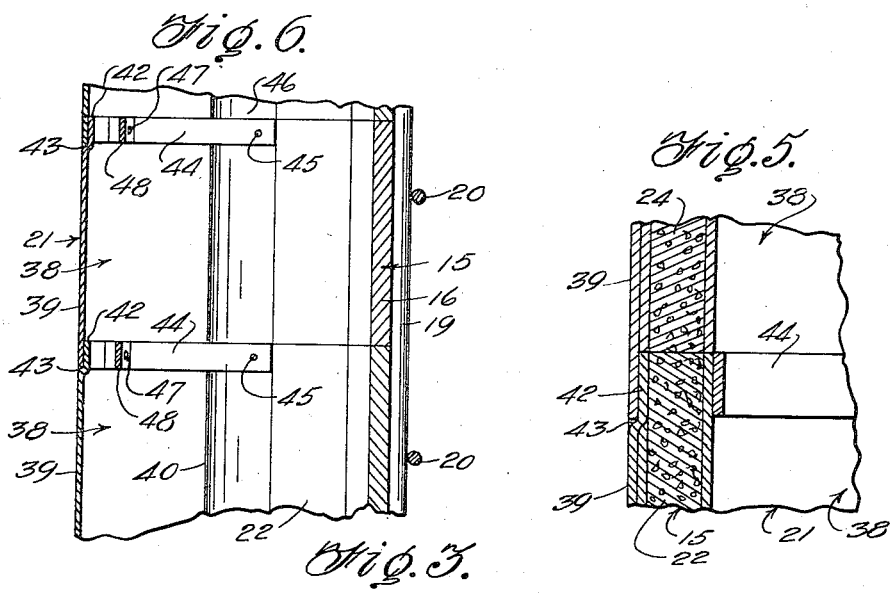
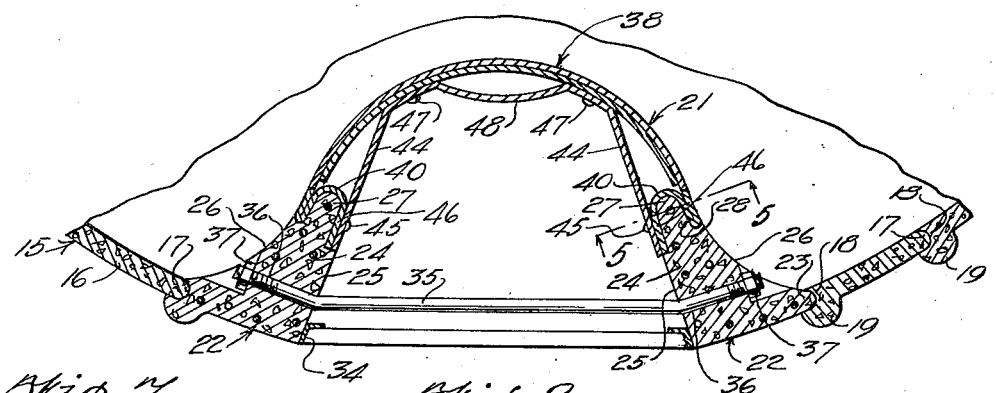
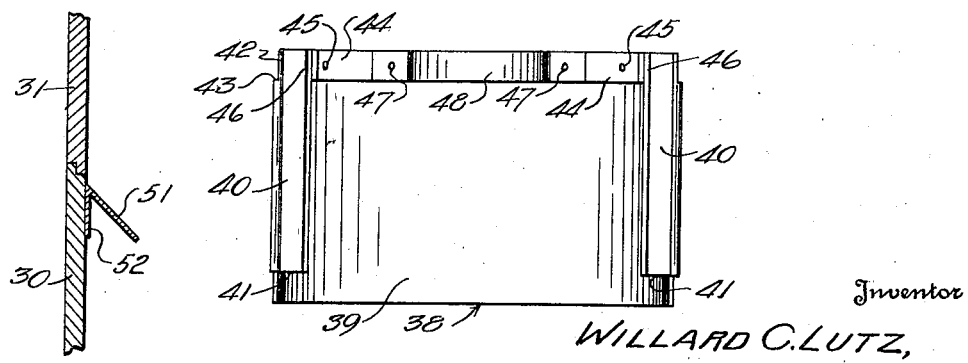
Inventor
WILLARD C. LUTZ,
By Kimmel & Crowell
Attorneys Patented Dec. 5, 1939

2,182,728

UNITED STATES PATENT OFFICE 2,182,728

SILO

Willard C. Lutz, Lancaster, Pa.

Application September 9, 1938, Serial No. 229,177

10 Claims. (Cl. 20—1.42)

This invention relates to silos, and more particularly to an improved silo provided with a self contained or concealed chute.

An object of this invention is to provide in a silo a chute interiorly of the silo which will permit the positioning of the body of the silo against a wall of a barn thereby eliminating the necessity of providing a fedd passage between the silo and the barn.

Another object of this invention is to provide a chute of this kind which is so constructed that the length of the chute may be varied according to the depth of the material in the silo.

A still further object of this invention is to provide an interior chute in a silo having removable plates, each plate carrying a step or rung of a ladder so that the inner wall of the chute may also serve as a means whereby a person may climb upwardly into the interior of the silo through the chute.

A further object of this invention is to provide in a silo an interior chute and a pair of doors at the bottom of the chute which are so constructed that when the material is being deposited in the chute from he inerior of the silo, the closed door portion will serve as a well to provide a chamber in which a sufficient quantity of material may be deposited for at least one feeding. In this manner sufficient material may be thrown down through the chute to not only fill up the chamber formed by the lower half portion of the door, but the material may overflow the upper edge of the lower door portion and run over into a receiver positioned against the door in order that sufficient material may be removed from the interior of the silo at one time to provide the necessary material for at least two feedings of the animals.

A further object of this invention is to provide a silo structure of this kind which will not only eliminate the outside chute which is provided in conventional silos, but will eliminate the disadvantage of such exterior chute arising from the difficulty of sealing the feed chamber at the lower end of the chute.

Embodying the objects aforesaid, and to others which may directly or indirectly appear, the invention consists of the novel construction, combination and arrangement of parts, as will be more specifically referred to and illustrated in the accompanying drawings, wherein is shown the preferred embodiment of the invention, but it is to be understood that changes, variations and modifications may be resorted to which fall within the scope of the invention as claimed.

Figure 2:
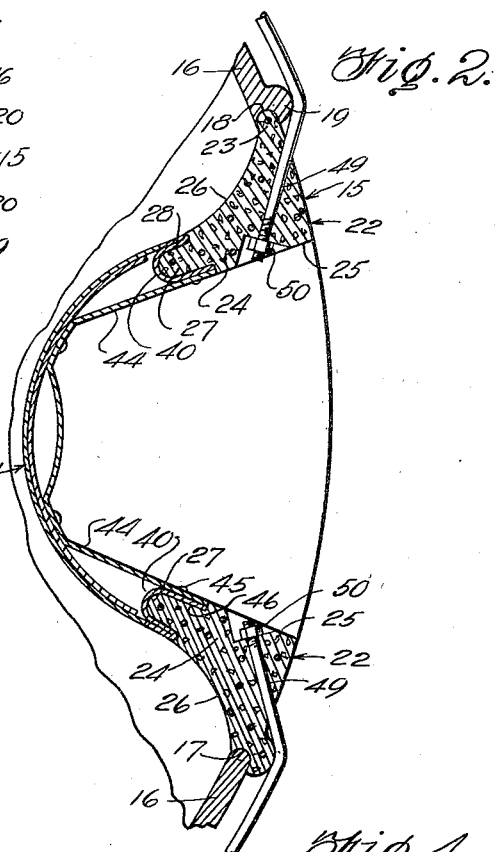
Figure 9:
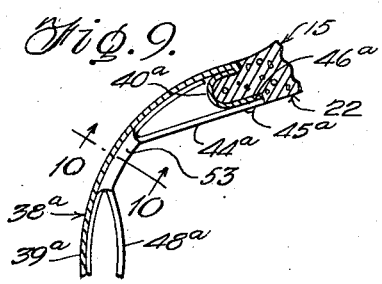
Figure 4:
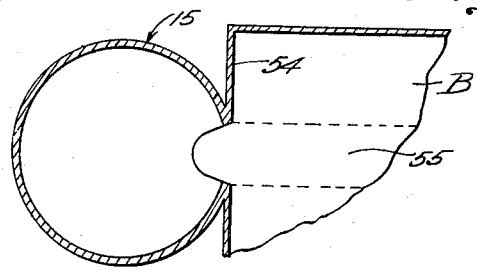
Figure 10:
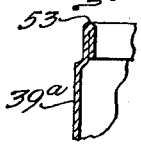

In the drawings:

Figure 1 is a detail front elevation of a silo constructed according to an embodiment of this invention, Figure 2 is an enlarged fragmentary sectional view taken on the line 2—2 of Figure 1, Figure 3 is an enlarged fragmentary sectional view taken on the line 3—3 of Figure 1, Figure 4 is a diagrammatic view of a silo and a fragmentary portion of a barn showing the position of the silo relative to the barn, Figure 5 is an enlarged fragmentary sectional view taken on the line 5—5 of Figure 3, Figure 6 is a fragmentary vertical section taken on the line 6—6 of Figure 1, Figure 7 is a fragmentary sectional view taken on the line 7—7 of Figure 1, Figure 8 is a detail front elevation of one of the chute sections, Figure 9 is a fragmentary top plan of a modified form of chute section, and Figure 10 is a fragmentary sectional view taken on the line 10—10 of Figure 9.

Referring to the drawings, the numeral 15 designates generally a silo which is constructed in cylindrical form and which is constructed out of a plurality of staves 16 provided at one vertical edge thereof with a rounded tongne 17 and at the other edge thereof with a concave socket or groove 18. In the present instance, the stave 16 is provided with a rib 19 adjacent the groove 18 on the outer side of the stave 16.

A plurality of clamping bands or rods 20 engage about the beads 19 so as to tightly hold the staves 16 in operative position. In silos at present available, it is a practice to provide a feed chute on the outside of the silo, and to provide a dormer in the roof of the silo so that a person may enter the silo from the top and discharge the material into the interior of the chute. In the present construction, the dormer is eliminated, and the chute is placed on the inside of the silo. The chute which is generally designated as 21 is of arcuate configuration in transverse section, and a portion of the chute 21 is formed by providing special staves 22.

The staves 22 are provided with a tongue 23 adapted to engage in a groove 18 of an adjacent stave 16, and each stave 22 is provided with an inwardly projecting wall 24. The wall 24 on one side thereof is relatively flat as at 25, this being the inner side of the chute, and the outer side of the wall 24 is arcuate or concave as at 26. By providing the arcuate wall 26 a substantially triangularly shaped stave 22 is provided which has an outer arcuate wall adapted to not only brace the wall 24, but also to prevent the formation of a pocket between the chute 21 and the wall of the silo as would be the case where a sharp corner is provided between the chute and the wall of the silo.

The wall 24 at its inner end terminates in a vertically disposed tongue 27 which is inwardly offset on one side with respect to the arcuate outer face portion 26 as at 28.

At the lower portion of the silo 10 a doorway 29 is provided, and certain of the staves 22 form the opposite sides or frame of the doorway 29. The doorway 29 is adapted to be closed by a pair of doors 30 and 31. These doors 30 and 31 are adapted to be hinged by suitable hinge members to one side of the doorway 29 as by hinge members 32 and 33, respectively. If desired, a metal frame 34 may be secured to the inner side of the staves 22 forming the doorway which comprises a frame to receive the doors 30 and 31. The frame 34 may be made out of metal such as angle-bars or the like, or if desired, may be cast in the lower staves 22.

At the upper and lower portions of the door opening 29 the staves 22 are tied together by means of a tie rod 35 which extends across the door opening 29 and through the inwardly projecting wall 24 as shown in Figure 3. The tie rod may be secured in an opening 36 provided in the stave 22 being tightly held by means of a nut 37 of each end thereof. This tie rod 35 at the upper portion of the doorway is also adapted to support the staves 16 which extend upwardly from the upper edge of the door opening 29.

A plurality of arcuate plats or chute sections 38 are adapted to be disposed in superposed and partly telescoping relation interiorly of the silo 15. Each chute section 38 comprises an arcuate plate 39 which is provided on the opposite vertical edges thereof with U-shaped channels or slide members 40. These channels 40 are formed by bending the plate 39 backwardly on itself and forming a U-shaped channel which is adapted to engage the tongue 27. The channel 40 as shown in Figure 8 terminates at its lower end as at 41 at a point upwardly from the lower edge of the plate 29 so that a preceding plate 39 is adapted to overlap the lower edge of a succeeding chute section 38.

The plate 39 at its upper edge is provided with an inwardly offset portion 42 forming a shoulder 43 so that a succeeding plate 39 is adapted to seat on the shoulder 43 with the inner surfaces of a pair of plates flush with each other as shown in Figures 5 and 6. In this manner a smooth surface is provided on the inner convex surface of the chute 21 so that no material will collect in the joints between the several chute sections 38. The chute sections 38 are adapted to be mounted on the inwardly convergent walls 24 and will be held on the walls 24 by reason of the inherent resiliency of the chute sections 38.

A pair of bracing members 44 are secured at one end as by a rivet or fastening member 45, or by welding, to the outer lip 46 of the channel 40 and the opposite end of the bracing member 44 is adapted to be secured as by a rivet or welding as at 47 to the plate 39 inwardly of the channel member 40 as shown in Figure 3.

There are two of these bracing members 44, one for each channel member 40, and a ladder rung 48 is preferably formed integral with the two bracing members 44 being disposed between the inner ends thereof and outwardly bulged in the form of an arc as shown in Figure 3 so as to offset the ladder member 48 from the adjacent portion of the chute section 38. The bar comprising the bracing members 44 and the ladder member 48 is disposed adjacent the upper edge of each plate section 39.

The stave members 22 which form the doorway 29 are each provided with an opening 49 therethrough so that an end of a clamping band 20 may be extended through the opening 49 and the holding nut 50 threaded tied from the inside of the chute 21 as shown in Figure 2. The lower door member 30 adjacent the upper edge thereof is provided with an outwardly and downwardly extending plate 51 which is formed by bending a sheet of metal in V-shape and securing one side 52 thereof to the outer side of the door member 30. This plate 51 is adapted to serve as a guide means so as to guide the material overflowing the lower door member 30 into a receiver which is positioned below the chute or plate member 51. In this manner when the lower chamber formed by the lower door 30 is filled, and the material overflows, the overflowing material will pass over the plate 51 and then be discharged into a suitable receiver. In this manner the lower chamber may be of such a size as to provide sufficient material to form at least one feeding of the animals and sufficient material is overflowed from this chamber to provide the first or initial feeding.

It will therefore be possible for the person inside the silo to throw down sufficient material at one time to form two feedings and when the first feeding has been accomplished the upper door 31 may be closed thus preventing air from contacting with the material in the silo and consequently spoiling the material.

In Figures 9 and 10 there is disclosed a modified form of chute section wherein the chute section 38ª has a pair of bracing members 44ª and a ladder member 48ª formed integral therewith by initially splitting the plate 39ª at its upper edge and bending this material outwardly. The bracing member 44ª and the ladder member 48ª are connected as by a connecting member 53 which is bent over the upper edge of the plate member 39ª at opposite ends of the ladder member 48ª. The outer ends of the bracing members 44ª are then secured as by welding or fastening members 45ª to the outer lip 46ª of the channel member 40ª.

In the use of this silo, the silo is assembled by the usual means, the silo having the usual base, and the staves 16 are then assembled and tightly secured by means of the clamping bands 20. The stave members 22 forming part of the chute 21 are disposed in vertical position on opposite sides of the door opening 29 and extend from the bottom to the top of the silo 15. At a point extending upwardly from the door opening 29, the usual stave members 16 are engaged with the chute members 22 which at such point are provided with a tongue on one side and a groove on the opposite side.

The silo may be filled in the usual manner by passing the material upwardly through the chute 21. After the silo has been filled with the chute sections 21 in position, and the material is cured, the material may be removed by opening the upper door member 31 and the person removing the material climbing inside the chute 21 over the ladder rungs 48. As the material is lowered in the inside of the silo, the uppermost chute sections 38 may be removed so that the person inside the silo can easily place the material from the inside of the silo into the interior of the chute 21.

The lower door member 30 is initially kept closed so as to provide a lower feed chamber inside the silo 15 and after this chamber has been filled, the additional material will overflow the upper edge of the door 30, and pass over and downwardly from the plate 51 into a suitable receiver below this plate 51. This overflowing material will constitute the initial feeding and then the upper door 31 may be closed with the lower chamber entirely filled with feeding material.

This feeding material in the lower chamber will constitute the second or morning feeding and if the upper door 31 is closed during the night the air can not readily get at the material so that the material will not spoil before it is used. The dropping of the material down the chute 21 will tend to pack the material tightly in the lower feed chamber so that this chamber will be free of air after it has been filled.

The combination of a silo constructed according to this invention with a barn will eliminate the usual supplemental feed chamber which is now positioned between the barn and the silo, as the door opening 29 may also open through an adjacent wall 54 forming part of the barn B. This wall 54 may be at one end of a passageway between opposed stalls so that the material may be taken along this passageway as shown at 55 and placed in the feeding hoppers provided for that purpose.

What I claim is:

1. A silo comprising a cylindrical housing having interposed in its body a pair of vertically disposed inwardly extending spaced apart guide members, and a plurality of superimposed chute members removably engaging in overlapping relation the inner portions of said guide members.

2. A silo comprising a cylindrical housing having interposed in its body a pair of vertically disposed oppositely spaced guide members, said members extending inwardly in the same general direction and forming a part of the interior wall of said housing, a plurality of chute members removably engaging in overlapping relation the inner portions of said guide members, said housing having a door opening in the lower portion thereof between said guide members, and a pair of superposed door members for closing said door opening.

3. A silo comprising a cylindrical housing, a collapsible chute interiorly of said housing, said chute including spaced fixed inwardly extending guide portions and removable portions, said fixed guide portions interposed in the body of the housing and detachably connecting the removable portions to said body, said housing having an opening at one end of said chute between said fixed portions, and a pair of superposed door members hingedly carried by one of said fixed guide portions for closing said opening.

4. In a silo a pair of vertically disposed parallel guide members, and a plurality of chute sections detachably engaging said members, each section comprising an arcuate plate, and a pair of U-shaped channel members carried by opposed edges of said plate.

5. In a silo a pair of vertically disposed parallel guide members, and a plurality of chute sections detachably engaging said members, each section comprising an arcuate plate, a pair of channel members carried by opposed edges of said plate, said channel members being disposed on the concave side of said plate, and a bracing member secured to a channel member and said plate.

6. In a silo a pair of vertically disposed parallel guide members, and a plurality of chute sections detachably engaging said members, each section comprising an arcuate plate, a pair of channel members carried by opposed edges of said plate, said channel members being disposed on the concave side of said plate, a bracing member secured to a channel member and said plate, and an inwardly offset ladder member integral with said bracing members.

7. A silo comprising a hollow body formed of a plurality of staves, a plurality of superposed arcuate chute sections, and coating means forming integral portions of certain of said staves for detachably holding said chute sections in vertical position, said means forming a part of the interior wall of the chute.

8. A silo comprising a plurality of staves, vertically disposed and inwardly projecting guide means carried by certain of said staves, a plurality of arcuate chute sections, and a pair of channel members carried by each section engageable with said guide means to detachably secure said chute section on said guide means.

9. A silo comprising a plurality of staves, vertically disposed spaced apart guide members integral with certain of said staves, a plurality of superposed arcuate chute members, a U-shaped channel carried by opposed edges of each chute member, a bracing bar for each channel member, means securing said bracing bars to said channel members and the concave side of said chute members, and a ladder rung carried by the concave side of each chute member.

10. A silo comprising a plurality of staves, clamping bands holding said staves together, vertically disposed and inwardly projecting guide means carried by certain of said staves, a plurality of superposed arcuate chute members, a pair of U-shaped channel members carried by opposed edges of each chute member and extending inwardly of the concave side thereof, each of said chute members having an inwardly offset upper edge portion forming a seat to receive the lower portion of a succeeding chute member, and a ladder rung fixed to each chute member on the concave side thereof.

WILLARD C. LUTZ.